United States Patent [19]

Lockery et al.

[11] 4,411,327
[45] Oct. 25, 1983

[54] APPARATUS FOR APPLYING A LOAD TO A STRAIN GAGE TRANSDUCER BEAM

[75] Inventors: Harry E. Lockery, Sudbury; Eric Laimins, Belmont, both of Mass.

[73] Assignee: Hottinger Baldwin Measurements, Inc., Framingham, Mass.

[21] Appl. No.: 263,505

[22] Filed: May 14, 1981

[51] Int. Cl.³ .......................... G01G 3/14; F16C 17/00
[52] U.S. Cl. .............................. 177/211; 177/DIG. 9; 308/6 R
[58] Field of Search .......................... 177/211, DIG. 9; 308/6 R

[56] References Cited

U.S. PATENT DOCUMENTS

| 659,939 | 10/1900 | Stimpson . | |
|---|---|---|---|
| 1,807,451 | 5/1931 | Stebbins | 308/6 R |
| 3,123,166 | 3/1964 | Schellentrager | 177/211 |
| 3,512,595 | 5/1970 | Laimins | 177/DIG. 9 |
| 3,526,286 | 9/1970 | Flinth | 177/201 |
| 3,565,196 | 2/1971 | Laimins et al. | 177/211 |
| 3,658,144 | 4/1972 | Corbitt | 177/258 |
| 3,736,998 | 6/1973 | Flinth et al. | 177/187 |
| 3,741,328 | 6/1973 | Andersson et al. | 177/210 |
| 3,894,595 | 7/1975 | Czyryk | 177/DIG. 9 |
| 4,064,955 | 12/1977 | Dyck | 177/134 |
| 4,094,369 | 6/1978 | Blanc et al. | 177/147 |
| 4,248,317 | 2/1981 | Rahav | 177/134 |
| 4,261,429 | 4/1981 | Lockery . | |
| 4,297,875 | 11/1981 | Kuhnle et al. | 73/862.62 |
| 4,307,787 | 12/1981 | Raboud et al. | 177/204 |

Primary Examiner—George H. Miller, Jr.
Attorney, Agent, or Firm—W. G. Fasse; D. H. Kane, Jr.

[57] ABSTRACT

In a platform scale in which the strain gage transducer beams are preferably formed as an integral part of a platform it is important that any distortions such as horizontal or angular force components that could falsify the reading of the weight, are prevented from affecting the transducers. For this purpose, the vertical load or weight representing force components are transmitted to each strain gage transducer beam through at least two cooperating curved, preferably spherical, surfaces. One curved surface has a larger curvature than the other so that a sufficient motion in any horizontal direction is permitted. The horizontal yielding prevents the transmission of a horizontal or angular force component to the sensing strain gages of the respective transducer beam but does not adversely affect the vertical force transmission to the transducer beams.

8 Claims, 8 Drawing Figures

4,411,327

APPARATUS FOR APPLYING A LOAD TO A STRAIN GAGE TRANSDUCER BEAM

CROSS-REFERENCE TO RELATED PATENT

The present disclosure is related to that disclosed in U.S. Pat. No. 4,261,429 issued on Apr. 14, 1981.

BACKGROUND OF THE INVENTION

The present invention relates to an apparatus for applying a load to a strain gage transducer beam, especially in a so-called platform scale. Such scales have a weight capacity in the range of 30 to 1000 lbs.

Typical examples of such platform scales are disclosed in the above mentioned U.S. Pat. No. 4,261,429. The bending beam transducers employed in such platform scales preferably form integral components of the platform proper. For this purpose slots are milled or machined or cut into the platform so that two parallel slots define a beam to which the strain gage elements are secured. The sensitivity of the transducer beams is adjusted by drilling holes into the platform at each inner end of each slot and between the ends of each slot. The free end of each beam is operatively supported on a rubber leg. Overload limiting elements are so arranged that the flexing of each beam is limited to a predetermined value.

Loads applied to the platform or to an intermediate member cause deflections of the sensing or transducer beams and these deflections in turn reduce the axial length of the beam. The length reduction is taken up by the resilience or compliance of the rubber legs. However, since the resilience or compliance is low, the application of horizontal load components to the sensing beams cannot be entirely avoided. Further, the platform is also subject to deflection in the vertical direction causing further shortening in both the longitudinal and in the transverse directions. Since platform deflections and resultant shortening in the longitudinal direction cause additional horizontal load components to be are applied to the sensing means. The same holds true for shortening of the platform in the transverse direction. In this connection the transverse and longitudinal directions of the platform are directions extending in the horizontal plane of the platform.

The above mentioned horizontal load components are undesirable because they cause nonlinearity errors in the output of the scale as well as higher hysteresis due to the poor mechanical characteristics of the rubber legs. Additionally, the so-called creep performance and the nonreturn to zero of the output display of the scale may also be attributed to the poor mechanical characteristics of the rubber legs as employed heretofore.

In addition to the above mentioned undesirable effects caused by longitudinal and lateral deflections, side loads applied to the scale during its operation may have similar effects. For example, if in addition to a load already on the scale a side force is inadvertently applied to the loaded scale some slippage may occur between the rubber feet or legs and the supporting surface. These side loads change the above mentioned effects resulting from horizontal load components or so-called "locked in forces" whereby the scale output is altered. Further output changes may be caused when the load to be weighed is applied in a direction not exactly vertical.

The above adverse effects primarily caused by the rubber feet have resulted in a limitation of the inherent and desirable performance characteristics of platform scales of the above described type having the sensing beams constructed as an integral component of the platform. Such platform scales are also referred to as "gaged plate" scales. Thus, the accuracy of such scales has been limited heretofore to approximately 0.05%. While such accuracy is quite adequate for many purposes, there is room for improvement, particularly in the application of the load to the sensing beam proper so as to avoid substantially all adverse load components.

OBJECTS OF THE INVENTION

In view of the above it is the aim of the invention to achieve the following objects singly or in combination:

to substantially reduce the introduction of adverse load components into the sensing beam in a platform scale;

to reduce nonlinearity and hysteresis values so that these values will not exceed 0.01% to 0.02% to reduce the so-called creep performance to values which are achievable by the strain gages and the sensing beam materials independently and unaffected by the presence of rubber feet or legs;

to avoid that horizontal loads temporarily applied to the scale when the latter is already loaded cause any permanent output errors, or stated differently, to make certain that the intermediate plate of a scale always returns to its original position;

to effectively restrain large horizontal load components by limiting the horizontal relative displacement between the two platforms or plates of a platform scale; and to effectively insulate in a mechanical sense the sensing beams of such platform scales from any adverse loads that may result due to the various deflections which occur within the scale or which may result from externally applied horizontally effective load components.

SUMMARY OF THE INVENTION

The apparatus of the invention transmits vertical force components between an upper and a lower horizontal member such as the two plates or platforms of a platform scale which extend substantially in parallel to each other while simultaneously preventing the transmission of substantially horizontal force components between the two horizontal members, plates or platforms. For this purpose first and second curved surface means cooperate with each other in the vertical force transmission and move relative to each other horizontally for insulating or preventing the transmission of horizontal force components or deflections. The first curved surface means has a given radius of curvature and is operatively located between the two horizontal members, plates or platforms, so that the first curved surface faces from one of the two horizontal members toward the other. The second curved surface means has a radius of curvature which is smaller than the given radius of curvature of the first curved surface means. The second curved surface means faces from the other member toward said one member for cooperation between the two curved surface means. Retaining means including a flexible element operatively secure at least one of the first or second curved surface means to the respective horizontal member, whereby the flexible element in cooperation with the curvatures of different radii prevents the transmission of horizontal or angular force components from one horizontal member to the other while transmitting vertical force components. In a platform scale one of the horizontal members may be a force transmitting bracket or bar.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
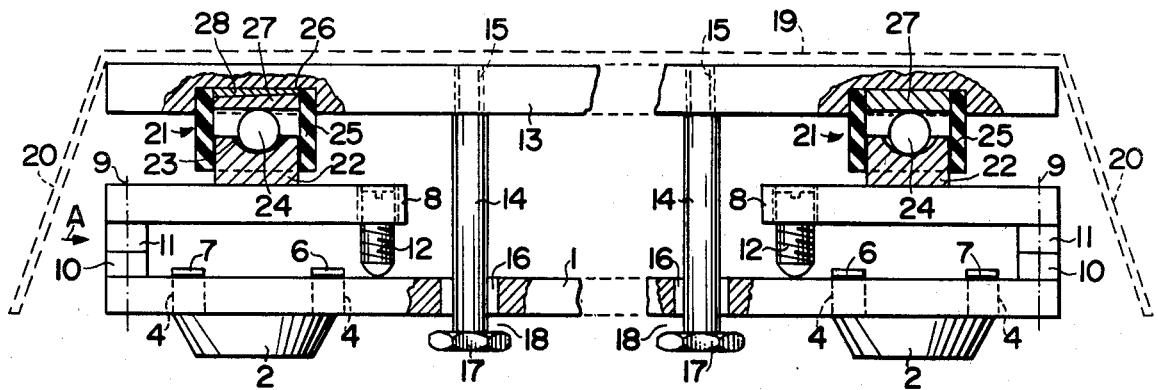
FIG. 1 is a side view, partially in section, onto a platform scale equipped with a load applying apparatus according to the invention.
Figure 1A:
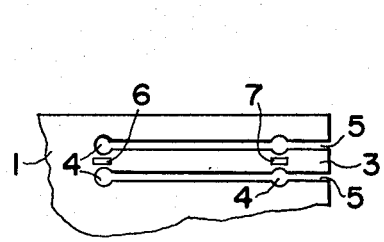
FIG. 1a is a top plan view onto a corner of a "gaged plate" provided with a sensing transducer beam as described in the above mentioned prior art.

FIG. 1 shows a platform scale improved according to the invention by a ball and socket arrangement for the load transmission. The platform scale comprises a first platform or gaged plate 1 to which the rubber feet 2 are conventionally secured, however, in positions outside the sensing transducer beams 3 rather than to the force applying brackets as shown in U.S. Pat. No. 4,261,429. The sensing beams 3 are formed as in the just mentioned U.S. Patent and as shown in FIG. 1a by drilling holes 4 into the plate or platform 1 and by cutting slots 5 into the platform, whereby the latter is "gaged." Strain gages 6 and 7 are then secured in a conventional manner to the sensing beam 3, for example, by adhesive.

A force transmitting bar or bracket 8 is secured to the free end of each sensing beam 3 by conventional means 9 merely indicated by a dashed line representing, for example, a threaded bolt and a respective nut extending through a spacer shim 10 and an overload stop 11. A further adjustable stop such as a set screw 12 is inserted into a threaded hole at the free end of the force transmitting bar 8 and may bear against the upwardly facing surface of the first platform or gaged plate 1. Incidentally, the construction is the same at each corner of the scale. Therefore, only one corner will be described. However, the strain gages 6 and 7 at each corner will be interconnected in bridge circuits as is customary and for example shown in said U.S. Pat. No. 4,261,429.

The scale comprises a second platform 13 to which the load is applied. Several shoulder bolts 14 are screwed into threaded holes 15 in the second platform 13. The shoulder bolts 14 extend through holes 16 in the first platform or gaged plate 1. The holes 16 have a larger diameter than the bolts 14, whereby a limited horizontal movement of the second platform 13 relative to the first platform 1 is permitted to the extent of the radial clearance corresponding to about 1.5 mm or 0.06" which is sufficient to avoid impeding vertical scale deflection. Under application of large horizontal loads the bolts 14 engage the edge of holes 16 and the horizontal loads are thus caused to bypass the load application means to be described below. The shouldered bolts 14 have leads 17 which are slightly spaced from the downwardly facing surface of the gaged plate 1 as shown at 18. This spacing also corresponds to approximately 1.5 mm or 0.06" and is sufficient to permit a limited vertical movement between the platforms 1 and 13, thereby simultaneously holding the platforms in a relatively defined position to prevent the separation of the vertical force transmitting means.

A protective cover 19 with a side skirt 20 shown in dashed lines in FIG. 1 may enclose the entire platform scale to prevent the entry of dust or the like into the scale structure, and to enhance appearance.

The vertical load applying means 21 according to the invention comprise in the embodiment of FIG. 1 a hardened steel socket 22 secured to the force transmitting bar or bracket 8 approximately midway between the respective strain gages 6 and 7. The socket 22 has a calotte or depression 23 forming a first curved surface having a given radius of curvature which is larger than the radius of curvature of the second curved surface formed by a steel ball 24. Retaining means including a flexible length of rubber tube 25 hold the ball 24 in position. For this purpose the flexible rubber tube 25 is secured with its upper end in a flat counter bore 26 facing downwardly in the second or upper platform 13. The tube 25 may be held in the counter bore 26 by adhesive or the like. The platform 13 bears on the steel ball 24 through a hardened steel plate 27 and, if necessary, through a shim 28. The hardened steel plate 27 and the shim 28 are also cemented in place. The shim 28 may be used to make sure that all four corners of the scale platform 13 properly bear on the respective steel ball 24.

While it is desirable to allow reasonable freedom of motion in all horizontal directions between the upper platform 13 and the lower platform 1, it is also necessary to restrict such relative horizontal movement to keep the upper platform or upper horizontal member 13 in a proper position. This restriction is provided to the required extent by the flexible rubber tube 25 which acts as a vibration damping element and which surrounds the socket 22 thereby also preventing the steel ball 24 from escaping out of the calotte 23. Thus, the rubber tube 25 restrains small loads in the horizontal direction by damping the small loads while the shoulder bolts 14 restrain larger horizontal loads once the bolts 14 bear against the surface of the respective bores 16.

Figure 2:
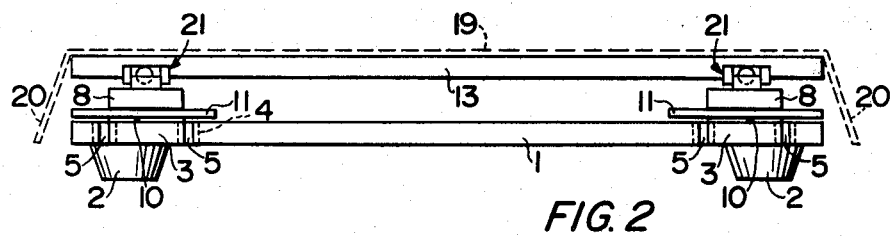
FIG. 2 is a side view similar to that of FIG. 1, but with the view extending in the direction of the arrow A in FIG. 1.

In FIG. 2 the same reference numbers are used as in FIG. 1 and a further detailed description of FIG. 2 is therefore not necessary.

In operation, the vertical load resulting from placing a weight on the platform 13, or rather on the cover 19 results in a central loading of the sensing beam 3 at each corner of the scale. Due to the central loading arrangement the beam 3 deflects in the fixed-fixed mode similar to the deflection characteristic of a dual guided cantilever beam. The maximum deflection is limited by the vertical width or thickness of the spacer shims 10 because when the beam is deflected to the extent of the width of the shim 10, the overload stop 11 comes to rest on the surface of the first platform 1. Any shortening or length reduction due to the load application of the sensing beams 3 and brackets 8 in either the longitudinal or transverse direction is taken up by the rolling of the ball 24 within the calotte 23 and along the plate 27 in the counter bore 26. The rolling friction is very low since the ball and calotte as well as the plate 27 are made of hardened steel, whereby adverse loads are very substantially reduced. Nonlinearity and hysteresis values have been reduced to levels of 0.01% to 0.02% or lower. The creep performance is reduced to values achievable by the strain gages and sensing element materials which means that the creep performance is unaffected by the presence of the rubber feet 2. Horizontal loads temporarily applied to the scale when a weight is placed on the scale platform in a careless manner do not cause any permanent errors since the intermediate platform or rather the upper platform 13 always returns to the original position due to the cooperation of the first and second curved surfaces represented by the calotte or depression 23 and the steel ball 24.

When the loads are removed the steel balls roll back in the calotte to their original position restoring the output of the scale to its original zero value.

Figure 3:
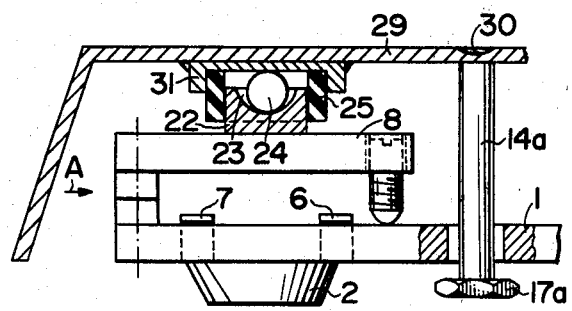
FIG. 3 is a view similar to that of FIG. 1, however illustrating a modification in the retaining means which hold the load application means in an operative position between the two platform members, or between horizontal members.

FIG. 3 shows an embodiment in which the entire structure is somewhat simplified in that the cover 29 forms simultaneously the upper platform. Large horizontal load components are again restrained by a member 14a which may be welded to the cover 29 as shown at 30. A mat 17a is added to a threaded portion of the lower end of the member 14a. The retaining means for the steel ball 24 again comprise the socket 22 with a calotte 23 and a flexible rubber tubing 25 retained in a flat pan type member 31, the latter for example welded to the downwardly facing surface of the cover 29. The pan type member 31 may itself be of hardened steel or a hardened steel plate such as shown at 32 in FIG. 4 may be inserted into the member 31. The upper end of the flexible rubber tubing 25 is cemented into the pan member 31. The operation of the structure of FIG. 3 is the same as described above.

Figure 4:
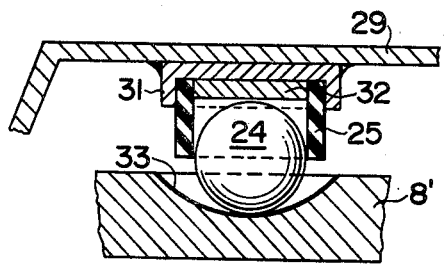
FIG. 4 illustrates a further modification in which one of the curved surface means forms part of a force transmitting bar or bracket.

In the embodiment of FIG. 4 the force transmitting bar 8' may itself be of hardened steel and provided with a calotte 33 receiving the ball 24 which is held in place by the flexible rubber tubing 25 having an inner diameter dimensioned to properly hold the ball in place while still permitting its slight horizontal motion. The upper end of the flexible rubber tube 25 is again cemented in place in a pan type member 31 welded to the cover 29. If a hardened steel plate 32 is inserted in the pan member 31 the latter does not need to be of hardened steel.

Figure 6:
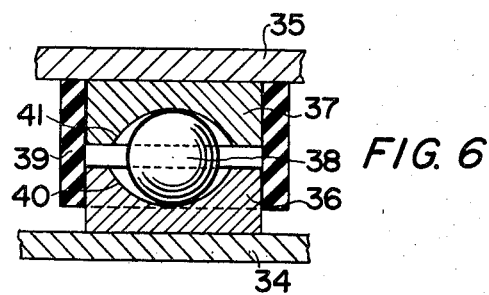
FIG. 6 is a sectional view showing a further modification in the load applying means between two horizontal members.

FIG. 6 shows an embodiment in which a lower horizontal member 34 such as a sensing beam or the like, is vertically spaced from an upper horizontal member 35 such as a cover or platform. First curved surface means are provided in the form of two calottes 40 and 41 in respective sockets 36 and 37 of hardened steel. The second curved surface is provided by the hardened steel ball 38 contacting the calottes 40 and 41. A flexible length of rubber tubing 39 is cemented to the upper platform 35 and retains the sockets 36 and 37 in such a manner that a small horizontal movement of the socket 37 relative to the socket 36 is permitted as described above.

Figure 5:
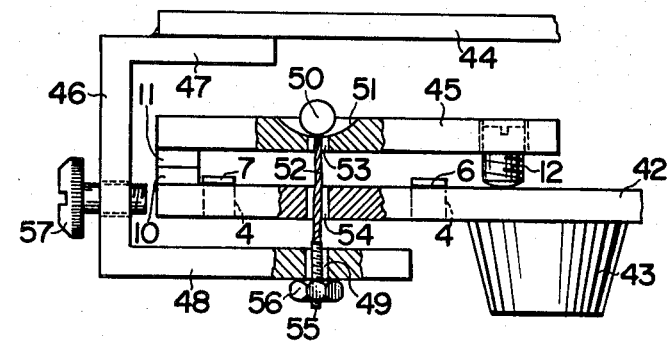
FIG. 5 illustrates a further modification in which the retaining means comprise a length of flexible cable.

The function of preventing horizontally effective adverse load components or adverse load components which extend at an angle to the horizontal, from affecting the sensing beam may also be accomplished by the modified embodiment shown in FIG. 5. In FIG. 5 the lower platform 42 is supported by rubber legs 43 and is equipped with the sensing beam to form the "gaged plate." The sensing beam carries the strain gages 6 and 7 as described. The upper platform 44 is held in position by a bracket 46 having a substantially U-cross-section with an upper leg 47, for example, welded to the platform 44 and with a lower leg 48 extending below the lower platform 42.

A load resting on the platform 44 is introduced into the sensing beam through a force transmitting bar 45 connected to the free end of the sensing beam through the spacer shim 10 and the overload stop 11 as described. The load application is accomplished through a ball 50 resting normally in a calotte 51 in the bar 45 and a flexible cable 52 operatively secured at its upper end to the ball 50 and extending through a hole 53 in the bar 45 as well as through a hole 54 in the platform 42 and a further hole 49 in the lower leg 48 of the bracket 46. The lower end of the flexible cable 52 has secured thereto a threaded piece of rod 55 cooperating with a nut 56. The diameter of the holes 49, 53, and 54 is large enough to permit a slight swaying of the flexible cable 52 in response to relatively small horizontal or angular force components thereby preventing these force components from affecting the sensing of the sensing beam. Application of larger horizontal force components is limited by the adjustable screw 57 in the bracket 46 which thus functions in the same way as the shoulder bolts 14. The adjustable screw 57 may act as a bumper which engages the platform 42 if the platform 44 should sway horizontally to an unpermissible extent.

In all embodiments there are two vertical load limiting components. One load limiting is accomplished by the above mentioned overload stop 11. The other is accomplished by the adjustable overload stop set screw 12. The stop 11 becomes effective when the load exceeds 100% of the rated scale capacity. The set screw stop 18 becomes effective substantially at the same time and the overload is transmitted to the supporting surface through the respective rubber feet 2 or 43. The second stop 18 is particularly advantageous in preventing shock loads from adversely affecting the scale. If both stops are used in combination it has been found that a scale rated, for example at 100 lbs., could be tested by dropping a 35 lb. test load onto the platform from a spacing of 15" above the upper platform without causing a zero shift of the scale of more than 0.1%.

It will be appreciated that the embodiments with a strong upper platform 13 as shown, for example in FIGS. 1 and 2, will be used for larger capacity scales while the use of the cover as a load application platform, as shown, for example in FIGS. 3 and 4 will be employed for lower capacity scales.

Incidentally, with regard to FIG. 5 it should be mentioned that by adjusting the nut 56 a proper leveling of the upper platform 44 may be accomplished if necessary. The bracket 46 may be welded to the upper platform 44. However, the type of connection is not material. Similarly, the invention is not limited to a curved surface in the form of a calotte as shown.

Figure 7:
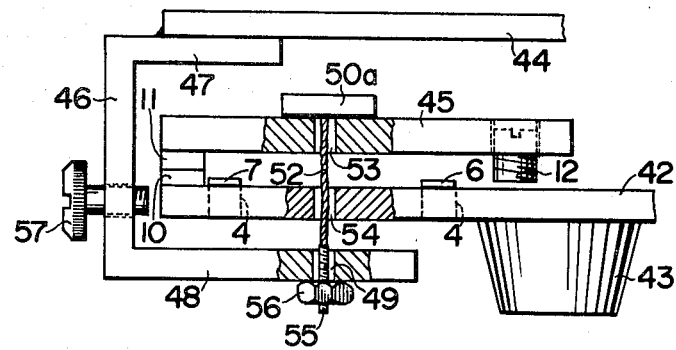
FIG. 7 shows a modification of FIG. 5 without any curved surface.

Rather, any form of connection, which maintains the flexible cable 52 in a fixed position is acceptable. In fact, the cooperating surfaces are not required to be curved at all. As shown in FIG. 7, a flat plate 50a could replace the ball 50 and the flexible cable 52 is attached to the plate 50a. Hole 53 would be sized to maintain the flexible cable 52 in a fixed position. In this embodiment the two cooperating curved surfaces have a radius of curvature of infinite length so that the two curved surfaces are substantially flat as shown at 45 and 50a in FIG. 7.

In addition to the above mentioned advantages regarding the improvement of the scale precision it should be mentioned that the present improvement also results in relatively flat scales which additionally satisfy so-called "legal for trade" requirements because adverse loads have been eliminated or prevented from affecting the sensing beam. The adverse loads are prevented from becoming effective either by the rolling motion of the two curved surfaces relative to each other in combination with the flexible element 25 or by means of the flexible cable 52.

Although the invention has been described with reference to specific example embodiments it is to be appreciated that it is intended to cover all modifications and equivalents within the scope of the appended claims.

What is claimed is:

1. An apparatus for applying a load to a strain gage transducer beam in a platform scale, comprising first platform means (1), strain gage transducer beam means (3) forming integral components of said first platform means (1), second platform means (13) arranged above and substantially in parallel to said first platform means (1), force transmitting bar means (8), connecting means located between said first and second platform means for operatively securing said force transmitting bar means to the respective integral transducer beam means (3), first curved surface means (23) including at least one cup having a depression having a given radius of curvature, said cup being arranged between said first and second platform means, second curved surface means (24) including a ball having a radius of curvature smaller than said given radius of curvature of said depression, said second curved surface means (24) also being arranged between said first and second platform means for contacting said depression in said first curved surface means, and means operatively securing said cup to one of said platform means for cooperation with the ball for transmitting vertical force components effective on said second platform means (13) through said force transmitting bar means to said transducer beam means, said first and second curved surface means further cooperating for substantially freely yielding to any horizontal or angular force components effective on said platform means when the platform means shift horizontally due to a reduction in the axial length of the beam due to its deflection to thereby prevent such horizontal or angular force components from affecting the sensing by said integral strain gage transducer beam means while simultaneously transmitting said vertical force components.

2. The apparatus of claim 1, wherein said cup of said first curved surface means faces upwardly with its depression, wherein said ball reaches downwardly into said depression, said apparatus further comprising a flexible element which retains said ball while permitting horizontal movement of said ball in said curved cavity which is larger in its curvature than the curvature of said ball, said flexible element simultaneously damping horizontal movements of said platform means relative to each other.

3. The apparatus of claim 3, further comprising means securing said flexible element in the form of a piece of elastomeric tubing to face downwardly and to encircle said cup.

4. The apparatus of claim 1, wherein said first curved surface means comprise two cups each having a depression therein, one depression facing downwardly the other depression facing upwardly, said apparatus further comprising a flexible element comprising a length of flexible elastomeric tubing encircling said two cups to hold said ball between the two cups in said depressions, said flexible element simultaneously damping horizontal movements of said platform means relative to each other.

5. The apparatus of claim 1, further comprising movement limiting means (14, 16) operatively secured to one of said platform means and cooperating with the other platform means for limiting a horizontal movement of one platform means relative to the other platform means and means (17) connected to said movement limiting means for preventing the vertical separation of said platform means from each other.

6. The apparatus of claim 1, further comprising a flexible sleeve operatively secured at one end to the upper horizontal platform, said cup being secured to the lower horizontal platform, said flexible sleeve encircling with its other end said cup, thereby providing a flexible, restoring and damping coupling between said platforms.

7. An apparatus for transmitting vertical force components between an upper horizontal member and a lower horizontal member, said members extending substantially in parallel to each other, comprising bracket means rigidly connected to the upper horizontal member, said bracket means being constructed to extend from the upper horizontal member to a position below the lower horizontal member without contacting said lower horizontal member under normal operating conditions, and suspension means extending between the lower horizontal member and the portion of the upper horizontal member bracket means extending below the lower horizontal member for suspension of the upper horizontal member from the lower horizontal member, said suspension means affording a substantially unyielding coupling between the upper and lower horizontal members in the vertical direction for transmitting vertical force components from the upper horizontal member to the lower horizontal member, said suspension means affording substantially yielding and flexible coupling between the upper and lower horizontal members in the horizontal direction, thereby substantially preventing transmission of horizontal force components between the upper and lower horizontal members, and foot means (43) connected to the lower horizontal member for supporting said apparatus to provide sufficient clearance for said bracket means (48), wherein each of said suspension means comprises a suspension cable and a bearing ball, said suspension cable being connected at its upper end to said bearing ball and wherein said lower horizontal member is formed with curved surface socket means in which said bearing ball rests.

8. An apparatus for applying a load to a strain gage transducer beam in a platform scale, comprising first lower platform means (1) having feet (2) for spacing the lower platform means above a floor, strain gage transducer beam means forming integral components of said first lower platform means, second upper platform means (3) arranged above and substantially in parallel to said first lower platform means (1), load transmitting means for transmitting vertical load components to said integral strain gage transducer beam means from said second, upper platform means (13) while simultaneously substantially preventing the transmission of horizontal or angular load components to said integral strain gage transducer beam means, said load transmitting means comprising for each integral strain gage transducer beam means a hardened steel ball (24) having a given radius, two hardened steel cups (22) with a depression (23) having a radius of curvatures larger than said given radius of the hardened steel ball for holding said steel ball in said depressions (23) of the cups, a flexible rubber tubular member surrounding said steel ball and rigidly connected at one end thereof to one of said platform means and operatively connected with the other end thereof to the other platform means for effectively damping vibrations of the platform means relative to each other caused by horizontal or angular load components, said apparatus further comprising holes (16) of a given diameter in said lower platform means (1), and shoulder bolts (14) rigidly connected at the upper end thereof to said upper platform means and having a diameter smaller than said given hole diameter, each shoulder bolt extending through its respective hole (16) for stopping horizontally or angularly effective shocks exceeding the damping capability of said flexible rubber tubular member (25), each shoulder bolt further having at its lower free end below said first platform means a member (17) of larger size than said hole diameter for preventing the separation of said upper and lower platform means from each other in the upward vertical direction, and wherein said steel ball (24) by virtue of its substantially frictionless rolling in said depressions (23) compensates for small horizontal shifts of said cups relative to each other resulting from a shortening of the axial length of the respective transducer beam means when the latter deflects, to thereby prevent undesirable horizontal and angular force components from becoming effective on the transducer beam means.

* * * * *

UNITED STATES PATENT AND TRADEMARK OFFICE
CERTIFICATE OF CORRECTION

PATENT NO. : 4,411,327

DATED : October 25, 1983

INVENTOR(S) : Harry E. Lockery; Eric Laimins

It is certified that error appears in the above-identified patent and that said Letters Patent is hereby corrected as shown below:

Claim 3, (Column 7, line 65) line 1, "claim 3" should read --claim 2--.

Signed and Sealed this

Third Day of January 1984

[SEAL]

Attest:

GERALD J. MOSSINGHOFF

Attesting Officer     Commissioner of Patents and Trademarks